United States Patent
Dobler et al.

(10) Patent No.: US 6,198,278 B1
(45) Date of Patent: Mar. 6, 2001

(54) PROCESS FOR DETERMINING THE THICKNESS OF A LAYER OF ELECTROCONDUCTIVE MATERIAL DEPOSITED ON A BODY

(75) Inventors: Klaus Dobler, Gerlingen; Hansjoerg Hachtel, Weissach; Reinhard Dimke, Stuttgart; Franz Auf der Heide, Litzendorf; Richard Blattert, Murr; Josef Weber, Oberriexingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/125,434
(22) PCT Filed: Nov. 8, 1997
(86) PCT No.: PCT/DE97/02615
  § 371 Date: Apr. 30, 1999
  § 102(e) Date: Apr. 30, 1999
(87) PCT Pub. No.: WO98/27400
  PCT Pub. Date: Jun. 25, 1998

(30) Foreign Application Priority Data

Dec. 18, 1996 (DE) ................................................ 196 52 750

(51) Int. Cl.[7] .............................. G01B 7/06; G01N 27/72; G01R 33/12

(52) U.S. Cl. ............................................. 324/230; 324/202
(58) Field of Search .................................. 324/229, 230, 324/231, 233, 202, 234, 236

(56) References Cited

U.S. PATENT DOCUMENTS 5,343,146 * 8/1994 Koch et al. ........................... 324/230

FOREIGN PATENT DOCUMENTS

| 1237 335 | * | 3/1967 | (DE) . |
| 2061708 | * | 7/1971 | (DE) . |
| 3404720 | * | 8/1985 | (DE) . |
| 42 27 735 | * | 2/1994 | (DE) . |
| 2145827 | * | 3/1985 | (GB) . |

* cited by examiner

Primary Examiner—Walter E. Snow
(74) Attorney, Agent, or Firm—Ronald E. Greigg; Edwin E. Greigg (57) ABSTRACT

A process for determining a thickness of a layer of electrically conductive material, any measurement errors are converted into dimensionless norm values with the aid of a normalization process. In this conversion, measurement errors, for example due to temperature drift and different electrical and magnetic properties of the base material of the carrying body can be largely eliminated. These norm values are converted into layer thickness values with the aid of a calibration curve.

20 Claims, 7 Drawing Sheets

FIG. 9

PROCESS FOR DETERMINING THE THICKNESS OF A LAYER OF ELECTROCONDUCTIVE MATERIAL DEPOSITED ON A BODY

PRIOR ART

The invention is based on a process for determining a thickness of a layer of electrically conductive material, particularly a chromium layer. In practical operation up to this point, chromium-plated parts have been measured using the X-ray fluorescence process, for example. This process, however, is expensive and time-consuming. Also, the so-called inductive measurement method is used. However with this kind of measurement, only point-like measurements on the surface are possible, which require a very high positioning precision for use in practical operation. In both processes, though, it is relatively difficult to eliminate the occurrence of measurement errors.

ADVANTAGES OF THE INVENTION

The process according to the invention, for determining the thickness of a layer of electrically conductive material, has the advantage over the prior art that the occurrence of measurement errors can be largely eliminated.

In particular, coated parts that are mass produced can be checked in a continuously operating measurement process. Possible fluctuations in the material quality of the base material and variations in the distance between the measurement coil and the measurement object to be defined that are caused, for example, by means of soiling or wear, can be eliminated. As a result, a very reliable and clear statement can be made as to the thickness of the layer to be defined.

Advantageous improvements and updates of the process disclosed are possible by means of the measures taken hereinafter.

BRIEF DESCRIPTION OF THE DRAWINGS

An exemplary embodiment of the invention is represented in the drawings and will be explained in more detail in the description that follows.

FIG. 4 shows the course of the norm values $M_e$ over the layer thickness a.

FIG. 6 shows the course of the norm values $M_e$ over the layer thickness a.

DESCRIPTION OF THE EXEMPLARY EMBODIMENTS

The measurement process according to the invention is based on the so-called inductive eddy current measurement principle. A sensor 10 that is used for this is structurally represented in FIG. 1. The sensor 10 is disposed in the recess 11 of a base body 12 and is comprised of a coil body 13 to which is attached a coil 14 that has a high-frequency alternating current, e.g. 4 MHz applied thereto. The coil 14 can, for example, be embodied as a flat coil or an annular coil. The coil body 13 is preferably comprised of electrically non-conductive and non-ferromagnetic material, e.g. plastic, and is guided in a virtually friction-free manner in the recess 11. The component 17 to be inspected is inserted into a guide body 18 that positions the component 17 and the coil 14 in relation to each other. The coil body 13 and consequently the coil 14 are pressed against the surface 20 of the component 17 with the aid of a spring 19. The surface 20 has the layer to be defined. The component 17 can, for example, be the connector of an injection valve, wherein the layer 20 then represents a chromium layer. If an alternating current is flowing through the coil 14, then a magnetic alternating field is generated, which penetrates both the chromium layer 20 and the material layer disposed underneath it that is comprised of the ferromagnetic material of the component 17. Then only the eddy current effect is active in the chromium layer 20, while the inductive and eddy current effects are active in the ferromagnetic material of the base body 17. Now the respective measurement effects that would occur if the respective other part did not exist will be explained in detail. If the coil 14 has an alternating current flowing through the coil and if the magnetic alternating field of the coil detects only a highly electrically conductive, but non-ferromagnetic material, i.e. only the chromium layer 20 would be detected by the magnetic alternating field of the coil, then only the so-called eddy current effect is active. Due to the eddy currents being produced in the highly electrically conductive, but non-ferromagnetic material, there is a reduction in the inductivity of the coil 14.

Figure 2:
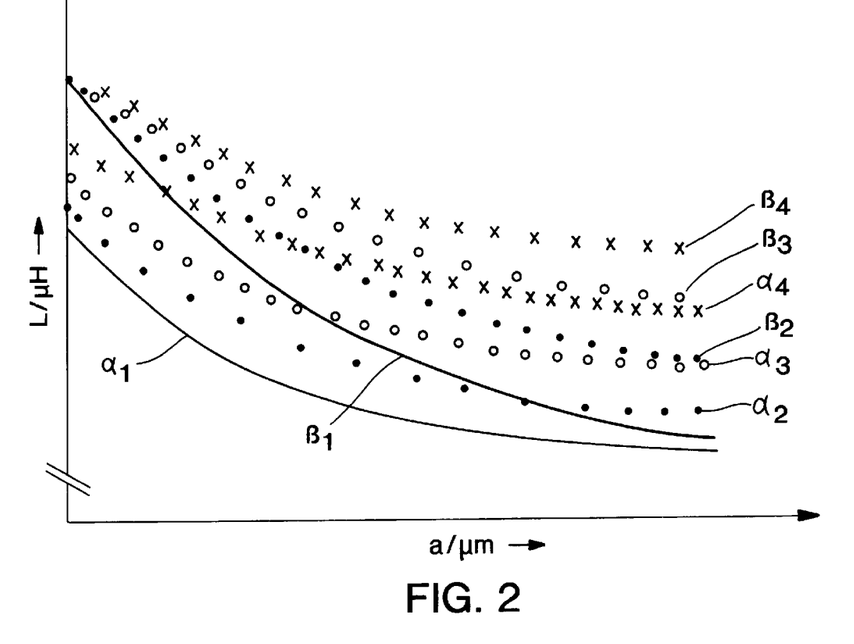
FIG. 2 shows the course of the inductivity L of the measurement coil over the thickness a of the layer to be defined, with different distances and with different material qualities α or β of the material disposed underneath the layer to be defined.

The action of the magnetic field of the coil 14 that has an alternating current flowing though the coil on the ferromagnetic material disposed opposite the coil, i.e. the material of the base body 17, will now be explained below. The magnetic alternating field of the coil produced by the alternating current detects the material of the base body 17. It should be noted that with electrically conductive and ferromagnetic material, both the ferromagnetic effect and the eddy current effect are active. While the eddy current effect produces an inductivity reduction in the measurement coil, the ferromagnetic effect produces an inductivity increase in the measurement coil. Which of the two effects predominates depends primarily on the frequency of the alternating current flowing through the coil 14 and on the material quality of the base body 17. If these two measurement effects are transmitted to the base body 17 with the chromium layer 20, then it can be established that the thicker the chromium layer 20 is, the weaker the magnetic field is and as a result, the inductivity of the coil 14 is weaker. FIG. 2 depicts a corresponding measurement curve with α1, which represents the decreasing course of the inductivity of the measurement coil 14 over the increasing thickness of the chromium layer 20.

The course of the measurement curve of the inductivity L over the layer thickness a, however, is a function of the material quality of the base body 17, i.e. is a function, for example, of the electrical resistance, the permeability of the material, and the distance between the coil 14 and the surface 20 to be measured. If, for example, soiling or abrasion of the coil body causes the distance between the measurement coil 14 and the chromium layer 20 to change, then different characteristic curves of the course of the inductivity L over the layer thickness a are produced.

Figure 3:
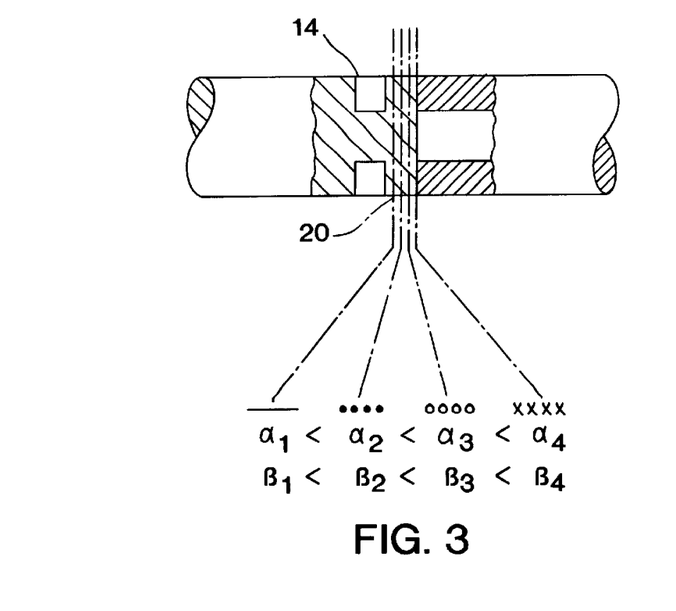
FIG. 3 shows the relationship of the different distances used in FIG. 2 between the measurement coil and the measurement object.

Different examples of this are shown in FIG. 2. The characteristic curves α2, α3, and α4 here represent the course of the inductivity L over the layer thickness a at different distances between the measurement coil and the chromium layer to be inspected, but with the same material quality of the base body 17. In this connection, FIG. 3 shows the magnitude of the distance α between the coil 14 and the chromium layer 20 to be inspected. It is clear that from α1 to α4, the distance continually increases. If the material quality of the material of the base body 17 were to be changed, though, then the characteristic curves β1 to β4 would be produced. The characteristic curves β1 to β4 in turn signify a variation of the distance between the measurement coil and the chromium layer to be inspected when there is a second material quality of the base body. From the diagram according to FIG. 2, it is clear that a measured inductivity value L can be associated with a large number of possible layer thicknesses. The alternating current resistance value of the coil can also be evaluated in lieu of the inductivity.

The measurement process according to the invention now also permits a clear association between the measured inductivity values L of the measurement coil 14 and the thickness of the chromium layer 20 if the material quality of the base body 17 and/or the distance between the measurement coil 14 and the surface of the chromium layer to be defined changes. The crux of the process according to the invention is to carry out a normalization that eliminates the occurrence of measurement errors and determines a clear, associable measurement value.

The process according to the invention for determining the thickness of a layer is carried out in a number of measurement and evaluation steps. Before the coating of the base body 17, a so-called pre-measurement of an inductivity value $L_0$ of the coil 14 is established. In this instance, the coil 14 rests as directly as possible on the as yet uncoated surface of the base body 17 oriented toward the coil (the measurement surface). Consequently, only one measurement is carried out in relation to the material of the base body 17. The magnitude of the inductivity value $L_0$ is a function of the quality of the base body, in particular its magnetic and electrical properties. This quality of the base body 17 can fluctuate in mass production. Therefore, the inductivity value $L_0$ must be determined for each individual base body 17 at the beginning of the measurement and must also be stored in a memory in an associable fashion.

The base body 17 is then provided with a chromium layer 20 in a corresponding coating apparatus. After this, a second measurement takes place, i.e. a so-called post-measurement, which is carried out at the same location on the base body 17 as the above-mentioned pre-measurement. This produces an inductivity value $L_x$ of the measurement coil 14. The magnitude of the inductivity value $L_x$ is determined among other things, from the thickness of the chromium layer 20 and from the material quality of the base body 17. It must be assured that both established inductivity values $L_0$ and $L_x$, respectively, are each to be clearly associated with the same base body 17. These two inductivity values $L_0$ and $L_x$, respectively, are now converted with the aid of an algorithm into norm values, i.e. into dimensionless characteristic numbers, which can be associated with a corresponding layer thickness. In order to be able to carry out this norm value generation, the inductivity value $L_\infty$ must be established. This inductivity value $L_\infty$ is obtained when a measurement is carried out on a calibration body exclusively with regard to a chromium layer. The surface of the calibration body must have a chromium layer that is of such a thickness that it shields the entire magnetic field of the coil so that neither the inductive nor the eddy current effect can be active in the ferromagnetic base material of the calibration body. If need be, another electrically conductive, but non-ferromagnetic material can also be used as a substitute for the chromium on the calibration body. The norm value $M_e$ is now determined according to the equation 1. The factor 1000 can be arbitrarily varied between zero and infinity.

$$M_e = 1000 \cdot \frac{L_x - L_0}{L_\infty - L_0} \quad (1)$$

$M_e$ = measurement value/norm value $L_0$ = inductivity value (uncoated base body)

$L_x$ = inductivity value (coated part)

$L_\infty$ = inductivity value (chromium calibration body)

Figure 4:
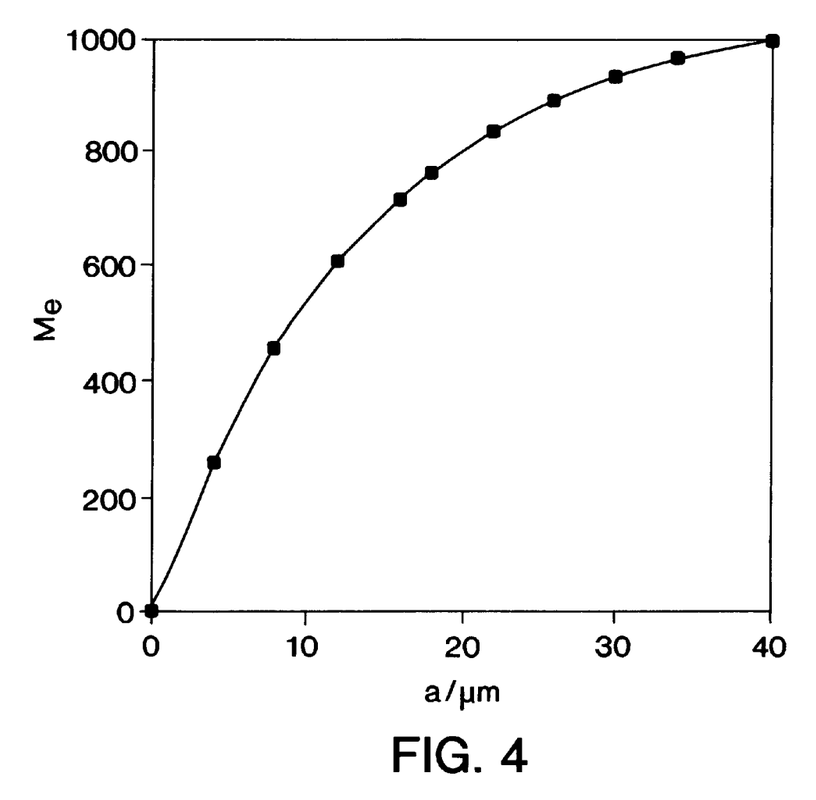

In FIG. 4, the course γ of the measurement values $M_e$ normalized in accordance with equation (1) is now depicted over the layer thickness a. The different curves shown in FIG. 2 yield a virtually concurrent course γ of the respectively determined norm values $M_e$. It is evident in FIG. 4 in comparison to FIG. 2, that it is possible to clearly associate a norm value $M_e$ with a thickness of the layer 20.

Up to this point, the errors that arise due to different magnitudes of the distances between the measurement coil and the layer to be defined and due to different magnetic or electrical properties of the material of the base body 17 have been virtually eliminated with the aid of equation 1. It is, however, also still possible to suppress the influence of the so-called offset drift on the measurement result that is produced, among other things, by temperature fluctuations. To this end, the inductivity value of the measurement coil must also be detected, which value is produced when the measurement coil measures in relation to only air, i.e. when it has neither a chromium layer nor any component disposed opposite it. This measurement value will be referred to below as the standard air value $L1_\infty$. It is determined just before or after (as contemporaneously as possible) the inductivity value $L_\infty$ is established with the aid of a calibration body. This value $L_\infty$, represents a base value that is used for the subsequent respective measurements. During the separate measurement of the individual base body 17, shortly before or after the above-mentioned, so-called pre-measurement, i.e. as contemporaneously as possible to the determination of the inductivity value $L_0$ of the coil, an inductivity value $L1_0$ is determined, which is produced when the measurement coil in turn measures in relation to air. Then a subtraction $\Delta L_0 = L1_0 - L1_\infty$ is carried out, for example in a microcomputer. Corrected inductivity values $L_0^* = L_0 - \Delta L_0$ are now calculated with the aid of this value $\Delta L_0$. Accordingly, the corrected measurement value $L_x^*$ must also be determined with the measurement of the inductivity value $L_x$. In this connection, the inductivity value of the coil in relation to air, which is called $L1_x$, is measured shortly before or after the above-mentioned post-measurement, i.e. shortly before or after the determination of the value $L_x$. The value of the coil in relation to air must be determined again here since there can be a difference in time and consequently a temperature fluctuation between the detection of the inductivity value of the coil in relation to air in the so-called pre-measurement and the detection in the so-called post-measurement. The so-called standard air value $L_\infty$, once established, can be used in the correction of both the inductivity value $L_0$ and the inductivity value $L_x$ over a longer span of time. It is also sufficient if the inductivity value $L_\infty$, which represents the inductivity value of a measurement exclusively in relation to a chromium layer, is only measured at intervals and is stored in a data base for a longer time. If, however, the inductivity value $L_\infty$ is measured again, in order, for example, to take into account a slow and continuous changing of the distance between the measurement coil and the measurement object (e.g. wear), then the so-called standard air value $L1_\infty$ must also be refreshed at the same time. During the norm value generation, equation 2 must now be used in order to also take into account the offset drift of the measurement result caused by temperature fluctuations.

$$M_e = 1000 \cdot \frac{(L_x - (Ll_x - Ll_\infty)) - (L_0 - (Ll_0 - Ll_\infty))}{L_\infty - (L_0 - (Ll_0 - Ll_\infty))} \qquad (2)$$

When a sensor is replaced, the inductivity value $L_\infty$ and $L1_\infty$ must be measured again. If the replacement takes place between the pre-measurement and the post-measurement, the old reference value $L1_\infty$ must also be used in the post-measurement.

Figure 8:
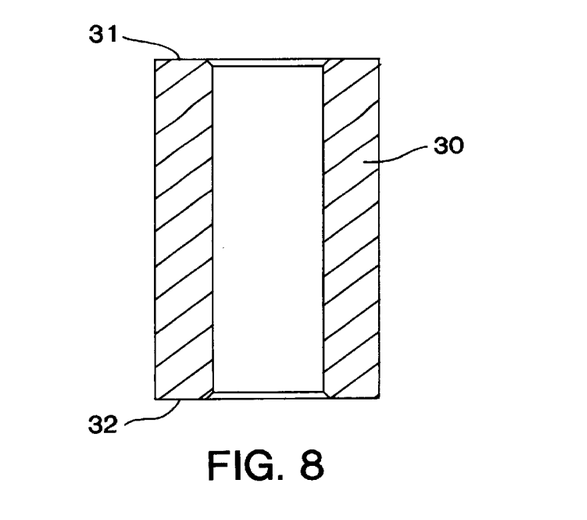
FIG. 8 shows a modification of the calibration body used in the measurement process.

With some materials for the base body 17, the electrical and magnetic properties of the material of the base body change over longer spans of time. This change, i.e. drift, can be different in magnitude with each measurement body to be defined since in addition to the material quality, this drift also depends on the individual heat treatment that takes place before the chromium plating. Therefore, calibration bodies, as shown in FIG. 8, are produced for the recording of adjustment characteristic curves, see FIG. 4. The calibration body 30 has two end faces 31 and 32. The measurement surface 31 in this instance is comprised of the uncoated base material and the measurement surface 32 is provided with the chromium layer. Both measurement surfaces 31 and 32, though, are the same shape. The thickness of the chromium layer deposited on the measurement surface 32 is known. The norm value determined when calibrating with this calibration body 30 does not change or only does so in a non-essential manner, even when the electrical and magnetic properties of the base material change, induced by changing processes. A prerequisite for this is a A homogeneous changing of the magnetic and electrical properties of the base material over the entire calibration body.

Figure 5:
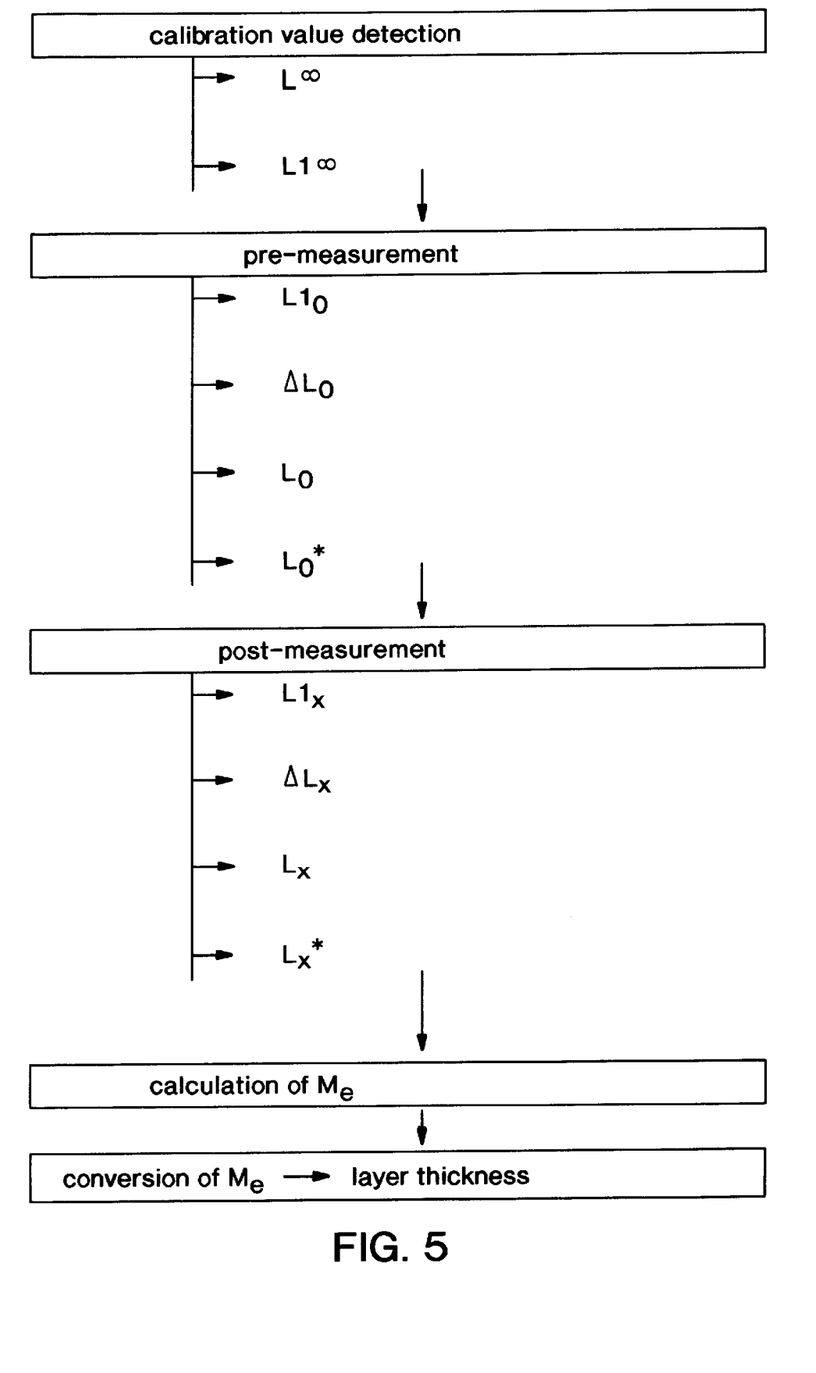
FIG. 5 shows a block circuit diagram of the process.

The individual measurement and calculation steps are listed again below in conjunction with the diagram according to FIG. 5. The measurement process occurs, as explained, roughly, in three steps, a so-called calibration value determination, a so-called pre-measurement, and a so-called post-measurement. In the calibration value determination, the inductivity value $L_\infty$ is detected which is determined exclusively in relation to the material (or its substitute material), whose thickness is determined, wherein the thickness of the calibration body is preferably greater than the penetration depth of the magnetic alternating field of the measurement coil. Then, the inductivity value $L1_\infty$ is determined, which represents the inductivity value of the measurement coil in relation to air as closely as possible to the time of the detection of the value $L_\infty$.

Now, the so-called pre-measurement section begins.
3. detection of the current inductivity value of the coil in relation to air $L1_0$
4. subtraction $\Delta L_0 = L1_0 - L_\infty$.
5. determination of the inductivity value $L_0$, i.e. the inductivity value in relation to the uncoated base body.
6. determination of the corrected value $L_0^*$ in accordance with the subtraction $L_0^* = L_0 - \Delta L_0$ Now, the calculation steps of the so-called post-measurement occur:
7. determination of the inductivity value of the coil in relation to air $L1_x$
8. execute the subtraction $\Delta L_x = L1_x - L1_\infty$
9. determination of the inductivity value $L_x$
10. determination of the corrected value $L_x^*$ by means of subtraction: $L_x^* = L_x - \Delta L_x$
11. execution of the norm value calculation in accordance with the equation with the values $L_\infty$ and $L_x^*$ or $L_0^*$
12. conversion of the norm value determined in 11 into a layer thickness with the aid of a calibration curve.

In a modification of the process, the inductivity value $L_0$ is no longer separately determined in relation to each individual component, but is now measured with the aid of a calibration element and is stored. This adjusting part, though, is not permitted to change its electrical and magnetic properties during the service life of the apparatus. The inductivity value $L_\infty$ is determined as described above. The measurement steps according to FIG. 7 will now be explained below, wherein for the sake of simplicity and for reasons of clarity, the correction of the drift in temperature is not taken into account. For this modification of the process, it is necessary to record a separate conversion calibration curve for each material in accordance with FIG. 6, and these curves are recorded using the same calibration elements used in step 1.

Step 1

Figure 7:
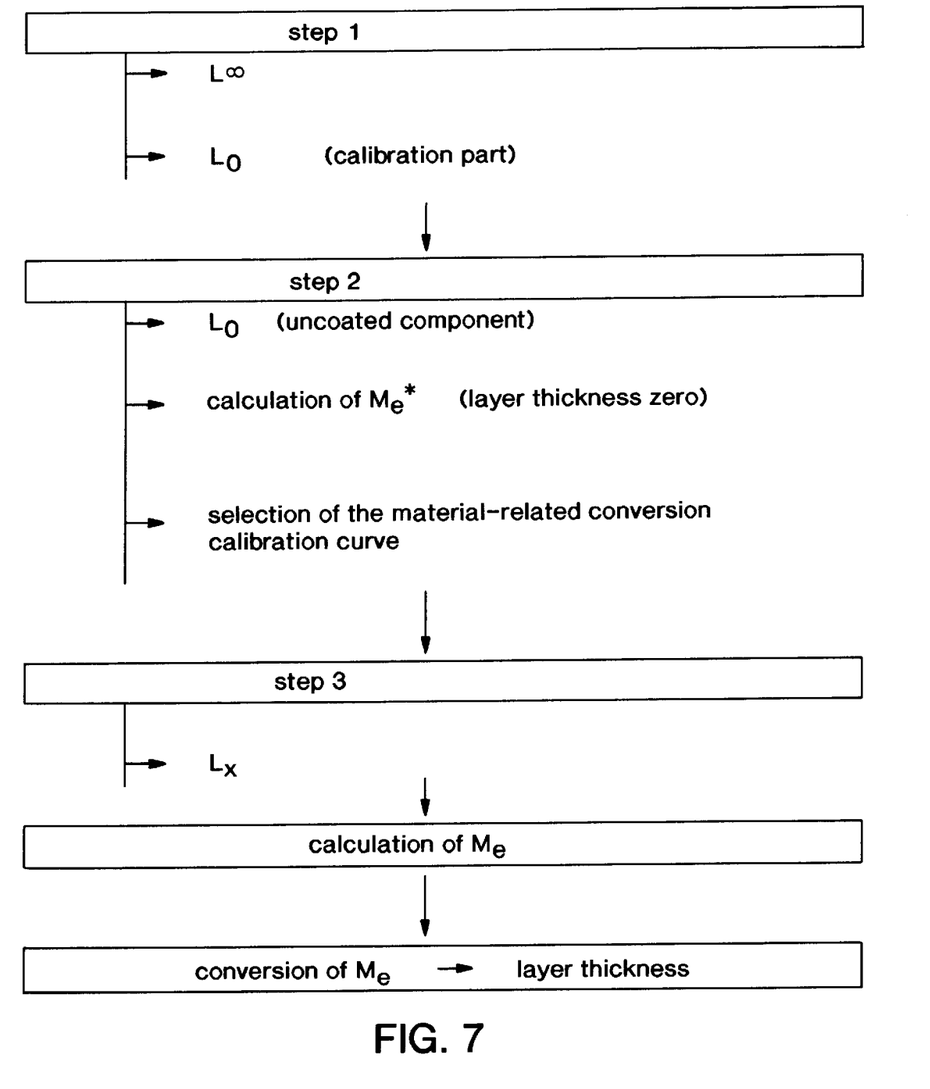
FIG. 7 shows another block circuit diagram of a modification of the process.

1. measurement of the inductivity value $L_\infty$ and storage in a data base
2. measurement of the inductivity value $L_0$ in relation to a calibration element and storage in a data base.

Step 2

Figure 6:
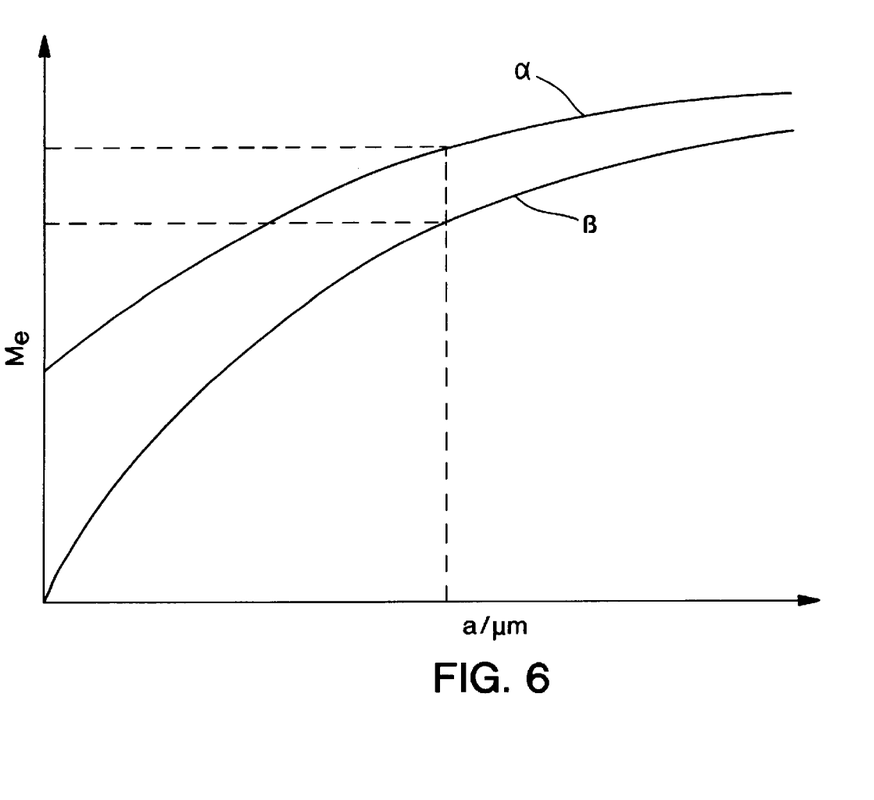

3. determination of the inductivity value $L_0$ in an uncoated component
4. calculation of the norm value $M_e$ with the aid of the equation 1 when the layer thickness is zero.
5. selection of the material-related conversion calibration curve according to FIG. 6.

Step 3

6. determination of the inductivity value $L_x$ in a coated component
7. calculation of the norm value $M_e$ with the aid of the equation 1
8. Conversion of the norm values into layer thickness values with the aid of a selected calibration curve.

It should be noted that in the process, in comparison to the eddy current process or inductive process used in the prior art, a high-frequency alternating current, e.g. 4 MHz, flows through the measurment coil. This results in lower coil inductivities. A coil core is not required so that a variable and reasonably priced construction is possible.

Through the use of a so-called multiplexer, it is possible to be able to measure a large number of measurement parts in a short time. In so doing, a large number of measurement coils are associated simultaneously with the measurement surfaces to be defined. By means of the multiplexer, these measurement surfaces are scanned for a short time one after the other by a measurement bridge. This is possible even if the inductivity values are determined using the above-mentioned high measurement frequency of e.g. 4 MHz.

Figure 1:
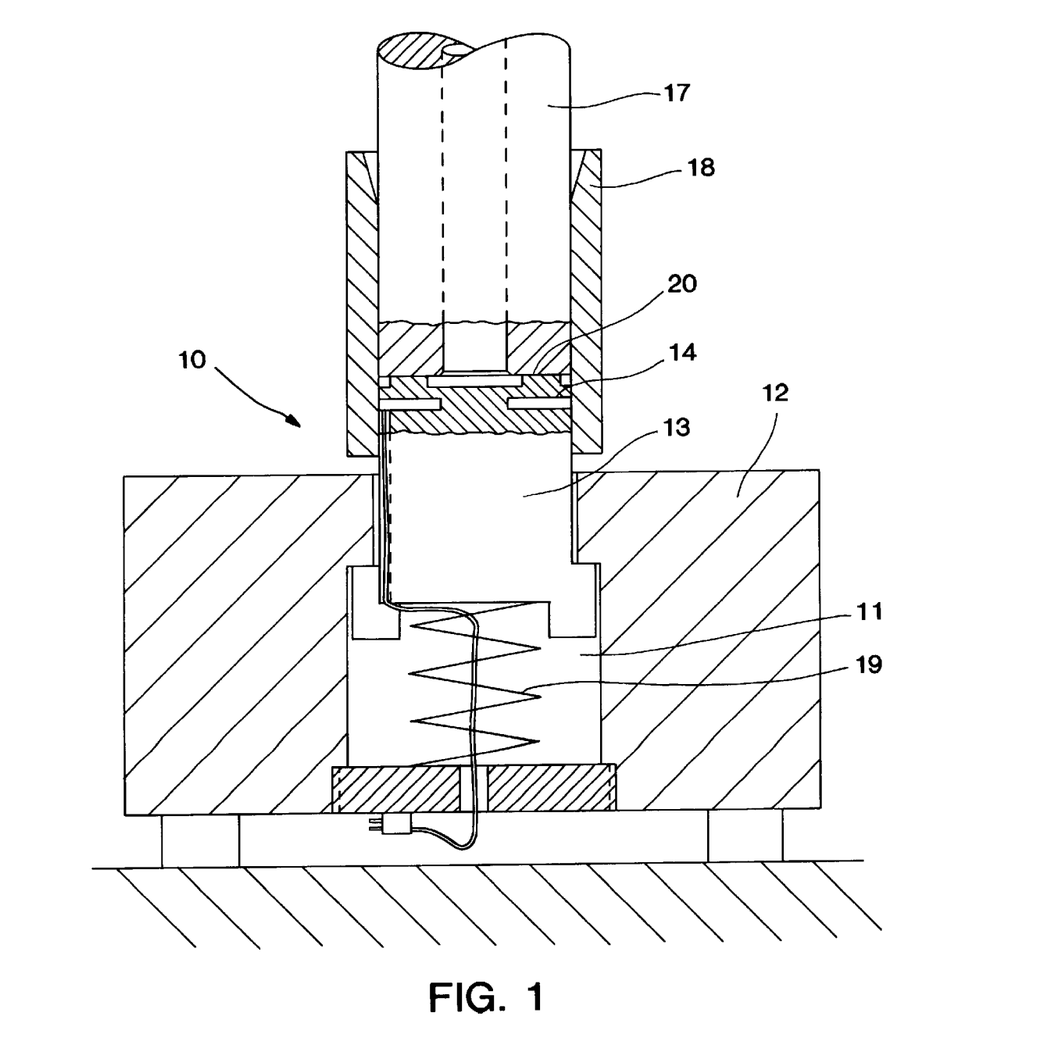
FIG. 1 shows a schematic design of the measurement device.
Figure 9:
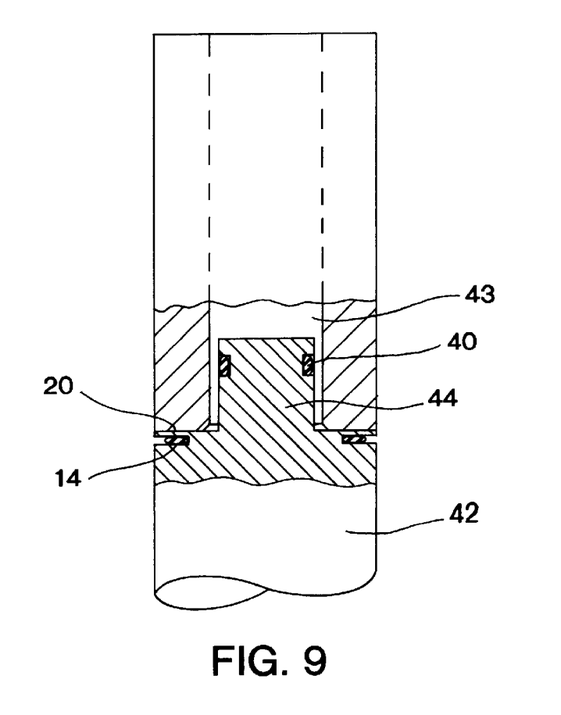
FIG. 9 shows a modification of the measurement body used in the measurement process.

FIG. 9 shows another embodiment of the structural apparatus according to FIG. 1. The detection of the inductivity value $L_0$ described in the process (measurement of the coil in relation to an uncoated component) can also be carried out with a separate second measurement coil 40. To this end, after the chromium plating whose thickness is to be measured, i.e. after the depositing of the layer, there is still an uncoated zone on the surface of the component to be inspected. With the component 41 represented in FIG. 9, a projection 44 of the coil body 42 protrudes into a bore 43 of the component 41. In this instance, the wall of the bore 43 is not covered with the chromium layer to be defined. The electrical and magnetic properties of the base body can now be determined with the aid of the coil 40, while at the same time a measurement can be carried out in relation to the chromium layer to be defined, with the aid of the measurement coil 14. With the aid of this sensor, it is possible that the component only has to be positioned on the sensor once so that an even shorter cycle time is produced.

The foregoing relates to a preferred exemplary embodiment of the invention, it being understood that other variants and embodiments thereof are possible within the spirit and scope of the invention, the latter being defined by the appended claims.

What is claimed is:

1. A process for determining a thickness of a layer (20) of electrically conductive material, which is deposited on a body (17) if ferromagnetic material, with the aid of at least one measurement coil (14) through which an alternating current flows, and the inductivity change of this measurement coil is evaluated, wherein the following measurement steps occur:

determination of an inductivity value $L_\infty$ of the coil (14) in a measurement exclusively in relation to a layer of the electrically conductive material;

determination of an inductivity value $L_0$ of the coil (14) in a measurement exclusively in relation to an uncoated base body of the ferromagnetic material;

determination of an inductivity value $L_x$ of the coil (14) in a measurement in relation to the coated layer (20) to be defined;

conversion of the inductivity values $L_\infty$, $L_0$ and $L_x$ into a dimensionless value $M_e$; and conversion of the value $M_e$ into a layer thickness value with the aid of a calibration curve.

2. The process according to claim 1, in which the dimesionless value $M_e$ is determined with the aid of the equation:

$$M_e = A \cdot \frac{L_x - L_0}{L_\infty - L_0}$$

$L_0$=inductivity value of the uncoated base body
$L_x$=inductivity value of the coated layer
$L_\infty$=inductivity value exclusively in relation to the layer of the electrically conductive material
A=factor.

3. The process according to claim 1, in which the inductivity value $L_0$ is determined in relation to a calibration part, that when the layer thickness is zero a norm value Me is found, with which the associated conversion curve is selected.

4. The process according to claim 2, in which the inductivity value $L_0$ is determined in relation to a calibration part, that when the layer thickness is zero a norm value Me is found, with which the associated conversion curve is selected.

5. The process according to claim 1, in which the dimensionless value $M_e$ is determined with the aid of the equation:

$$M_e = A \cdot \frac{(L_x - (Ll_x - Ll_\infty)) - (L_0 - (Ll_0 - Ll_\infty))}{L_\infty - (L_0 - (Ll_0 - Ll_\infty))} \quad (2)$$

$L1_x$: inductivity value in relation to air before or after the detection of $L_x$ $L1_0$: inductivity value in relation to air before or after the detection of $L_0$ $L1_\infty$: inductivity value in relation to air before or after the detection of $L_\infty$.

6. The process according to claim 2, in which the dimensionless value $M_e$ is determined with the aid of the equation:

$$M_e = A \cdot \frac{(L_x - (Ll_x - Ll_\infty)) - (L_0 - (Ll_0 - Ll_\infty))}{L_\infty - (L_0 - (Ll_0 - Ll_\infty))} \quad (2)$$

$L1_x$: inductivity value in relation to air before or after the detection of $L_x$ $L1_0$: inductivity value in relation to air before or after the detection of $L_0$ $L1_\infty$: inductivity value in relation to air before or after the detection of $L_\infty$.

7. The process according to claim 3 in which the dimensionless value $M_e$ is determined with the aid of the equation:

$$M_e = A \cdot \frac{(L_x - (Ll_x - Ll_\infty)) - (L_0 - (Ll_0 - Ll_\infty))}{L_\infty - (L_0 - (Ll_0 - Ll_\infty))} \quad (2)$$

$L1_x$: inductivity value in relation to air before or after the detection of $L_x$ $L1_0$: inductivity value in relation to air before or after the detection of $L_0$ $L1\infty$: inductivity value in relation to air before or after the detection of $L_\infty$.

8. The process according to claim 1, in which a high-frequency alternating current flows through the coil (14).

9. The process according to claim 2, in which a high-frequency alternating current flows through the coil (14).

10. The process according to claim 3, in which a high-frequency alternating current flows through the coil (14).

11. The process according to claim 4, in which a high-frequency alternating current flows through the coil (14).

12. The process according to claim 1, in which a determination of the inductivity value $L_0$ and the inductivity value $L_x$ is carried out in a calibration body (30) with homogeneous material composition.

13. The process according to claim 2, in which a determination of the inductivity value $L_0$ and the inductivity value $L_x$ is carried out in a calibration body (30) with homogeneous material composition.

14. The process according to claim 3, in which a determination of the inductivity value $L_0$ and the inductivity value $L_x$ is carried out in a calibration body (30) with homogeneous material composition.

15. The process according to claim 5, in which a determination of the inductivity value $L_0$ and the inductivity value $L_x$ is carried out in a calibration body (30) with homogeneous material composition.

16. The process according to claim 8, in which a determination of the inductivity value $L_0$ and the inductivity value $L_x$ is carried out in a calibration body (30) with homogeneous material composition.

17. The process according to claim 1, in which the inductivity value $L_0$ and the inductivity value $L_x$ are respectively determined at virtually the same time with the aid of a separate measurement coil (14, 40).

18. The process according to claim 2, in which the inductivity value $L_0$ and the inductivity value $L_x$ are respectively determined at virtually the same time with the aid of a separate measurement coil (14, 40).

19. The process according to claim 3, in which the inductivity value $L_0$ and the inductivity value $L_x$ are respectively determined at virtually the same time with the aid of a separate measurement coil (14, 40).

20. The process according to claim 5, in which the inductivity value $L_0$ and the inductivity value $L_x$ are respectively determined at virtually the same time with the aid of a separate measurement coil (14, 40).

* * * * *